United States Patent
Lina

(10) Patent No.: US 9,754,374 B1
(45) Date of Patent: Sep. 5, 2017

(54) DETECTION OF A SHEET OF LIGHT BASED ON SECOND DERIVATIVE

(71) Applicant: MATROX ELECTRONIC SYSTEMS LTD., Dorval (CA)

(72) Inventor: Arnaud Lina, Dorval (CA)

(73) Assignee: MATROX ELECTRONIC SYSTEMS LTD., Dorval (CA)

( * ) Notice: Subject to any disclaimer, the term of this patent is extended or adjusted under 35 U.S.C. 154(b) by 23 days.

(21) Appl. No.: 15/042,860

(22) Filed: Feb. 12, 2016

(51) Int. Cl.
*G06K 9/46* (2006.01)
*G06T 7/00* (2017.01)

(52) U.S. Cl.
CPC .......... *G06T 7/0044* (2013.01); *G06K 9/4661* (2013.01); *G06T 7/0057* (2013.01); *G06T 2207/20024* (2013.01)

(58) Field of Classification Search
CPC ............... G06K 9/4661; G06T 7/0057; G06T 2207/20024
USPC ........................................................ 382/103
See application file for complete search history.

(56) References Cited

U.S. PATENT DOCUMENTS

| | | | |
|---|---|---|---|
| 4,645,347 A | 2/1987 | Rioux | |
| 4,749,879 A | 6/1988 | Peterson et al. | |
| 4,819,197 A | 4/1989 | Blais | |
| 4,966,459 A | 10/1990 | Monchalin | |
| 5,155,775 A | 10/1992 | Brown | |
| 5,774,572 A | 6/1998 | Caspi | |
| 5,923,023 A | 7/1999 | Arends et al. | |
| 5,953,124 A | 9/1999 | Deck | |
| 5,999,587 A | 12/1999 | Ning et al. | |
| 6,343,741 B1 | 2/2002 | Arends et al. | |
| 6,512,993 B2 | 1/2003 | Kacyra et al. | |
| 6,704,099 B2 | 3/2004 | Uomori et al. | |
| 6,975,755 B1 | 12/2005 | Baumberg | |
| 7,577,312 B2 | 8/2009 | Sandrew | |
| 7,601,978 B2 | 10/2009 | Sari-Sarraf et al. | |
| 7,903,864 B1 | 3/2011 | Lina et al. | |
| 8,334,900 B2 | 12/2012 | Qu et al. | |
| 8,537,338 B1 | 9/2013 | Medasani et al. | |

(Continued)

OTHER PUBLICATIONS

Josep Forest et al., "Laser stripe peak detector for 3D scanners. A FIR filter approach", Proceedings of the 17th International Conference on Pattern Recognition (ICPR'04), IEEE, 2004, pp. 1-4.

(Continued)

*Primary Examiner* — Amandeep Saini
(74) *Attorney, Agent, or Firm* — Nicholson De Vos Webster & Elliott LLP

(57) ABSTRACT

A method for detecting a position of a sheet of light is described. A second derivative filter is applied to an intensity profile of a line of pixels. An ingress pixel position associated with an ingress zero-crossing second derivative value is determined. The ingress pixel position is between a first pixel position with a first minimum intensity value of the intensity profile and a second pixel position with a first maximum intensity value of the intensity profile. An egress pixel position associated with an egress zero-crossing second derivative value is determined. The egress pixel position is between a third pixel position with a second maximum intensity value of the intensity profile and a fourth pixel position with a second minimum intensity value of the intensity profile. A midpoint pixel position between the ingress pixel position and the egress pixel position is output as the position of the sheet of light.

27 Claims, 10 Drawing Sheets

(56) References Cited

U.S. PATENT DOCUMENTS

| | | |
|---|---|---|
| 8,620,089 B1 | 12/2013 | Korah et al. |
| 8,660,362 B2 | 2/2014 | Katz et al. |
| 2003/0031385 A1 | 2/2003 | Elad et al. |
| 2003/0169375 A1 | 9/2003 | Lin et al. |
| 2004/0247174 A1 | 12/2004 | Lyons et al. |
| 2011/0229029 A1* | 9/2011 | Kass .................. G06T 5/002 382/168 |
| 2013/0100250 A1 | 4/2013 | Raskar et al. |
| 2014/0008549 A1 | 1/2014 | Theriault et al. |
| 2014/0161359 A1 | 6/2014 | Magri et al. |
| 2015/0052426 A1 | 2/2015 | Wu |
| 2015/0379942 A1 | 12/2015 | Guo et al. |

OTHER PUBLICATIONS

Yutao Wang et al., "Modeling outlier formation in scanning reflective surfaces using a laser stripe scanner", Measurement 57, 2014, pp. 108-121.

V. Matiukas et al., "Detecton of Laser Beam's Center-line in 2D Images", Electronics and Electrical Engineering, High Frequency Technology, Microwaves, T191, 2009. No. 7(95), Mar. 27, 2009, pp. 67-70.

Carles Matabosch et al., "Registration of Moving Surfaces by Means of One-Shot Laser Projection", IbPRIA 2005, LNCS 3522, pp. 145-152, 2005.

J. Forest et al., "A Proposal for Laser Scanners Sub-pixel Accuracy Peak Detector", Workshop on European Scientific and Industrial Collaboration, 2003, pp. 525-532.

Joaquim Salvi et al., "Pattern codification strategies in structured light systems", Pattern Recognition, vol. 37, Issue 4, Apr. 2004, pp. 827-849.

Ken K. Lee, "Surface Extraction From a Three-Dimensional Data Set", H1530, May 7, 1996, pp. 1-30.

Notice of Allowance for U.S. Appl. No. 14/522,766, mailed Apr. 26, 2016, 23 pages.

* cited by examiner

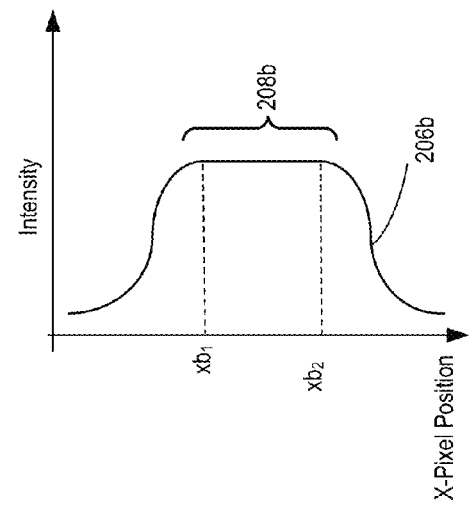
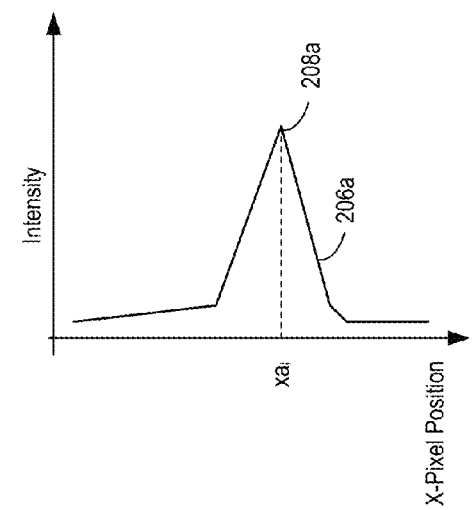
Fig. 2B
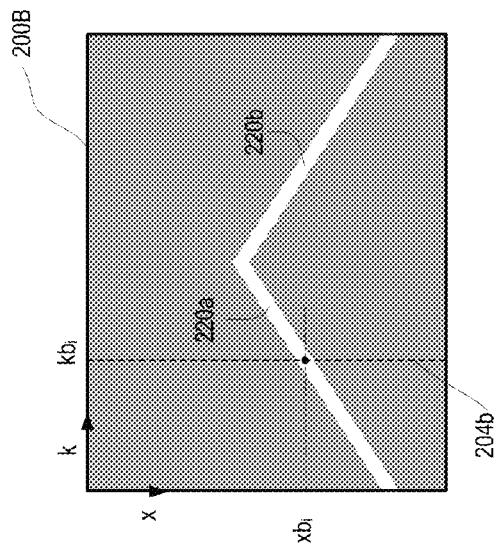
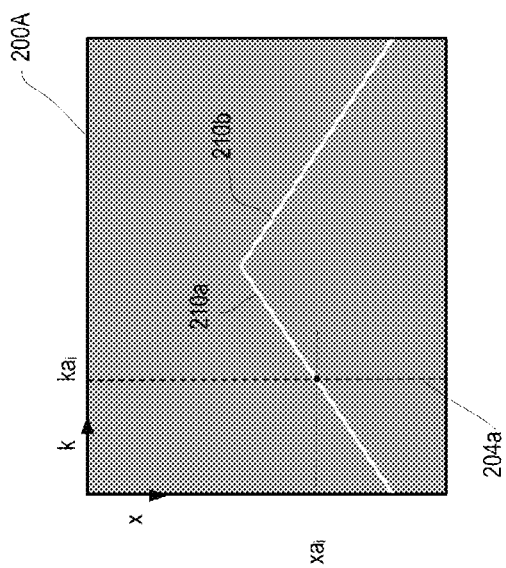
Fig. 2A

FIGURE 4A
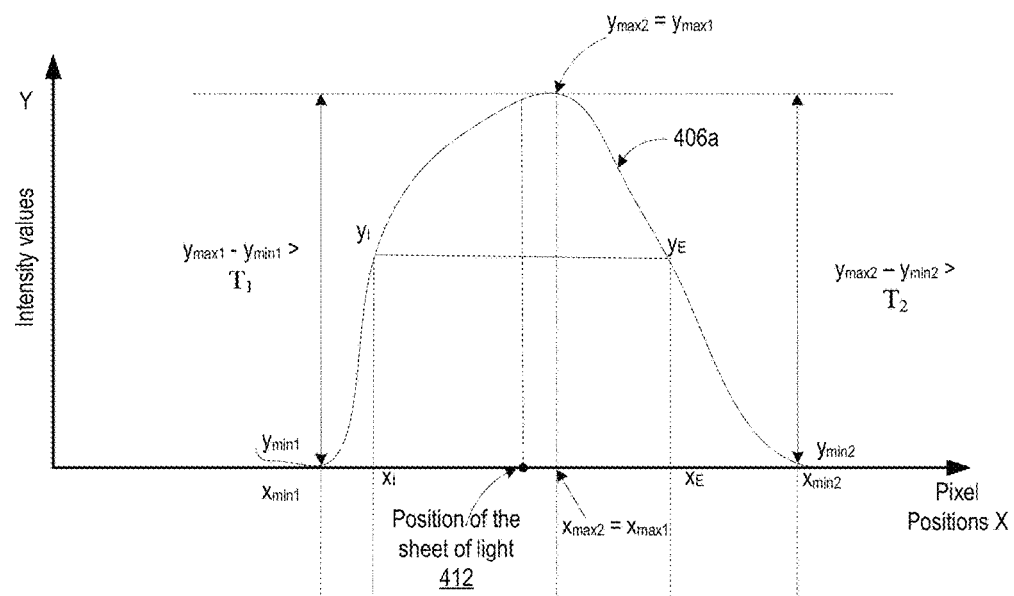
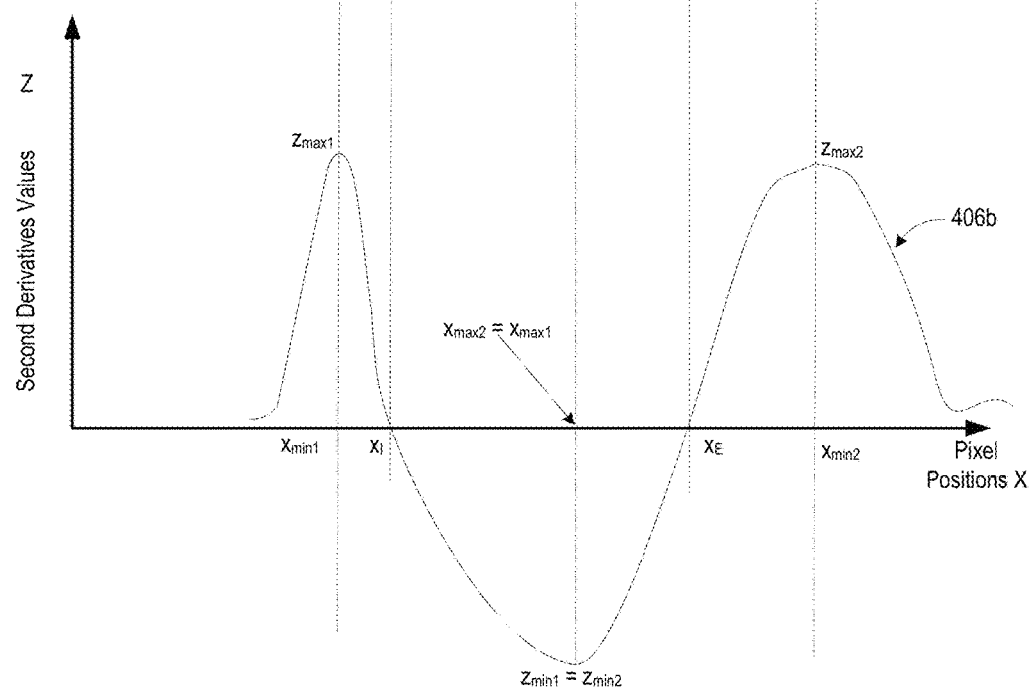
FIGURE 4B

DETECTION OF A SHEET OF LIGHT BASED ON SECOND DERIVATIVE

FIELD

Embodiments of the invention relate to the field of image processing, and more specifically, to the detection of a sheet of light in an image.

BACKGROUND

In three-dimensional (3D) measurement/reconstruction systems, a laser projects one or more laser lines (or laser beams) onto an object of interest, and an image of the object illuminated by the laser is acquired. The position of the laser beam in the acquired image is detected to calculate 3D measurements and/or reconstruct the object of interest. The accuracy of the 3D measurement/reconstruction depends on the accuracy of the detected position of the laser beam(s) in the acquired image.

SUMMARY

Methods and systems for detecting the position of a sheet of light in an image are described. The methods are based on a second derivative of an intensity profile of the image. A second derivative filter is applied to the intensity profile of a line of pixels included in the image of the sheet of light as projected onto an object to obtain a plurality of second derivative values associated with corresponding pixel positions. An ingress pixel position associated with an ingress zero-crossing second derivative value is determined. The ingress pixel position is determined as being located between a first pixel position with a first minimum intensity value of the intensity profile and a second pixel position with a first maximum intensity value of the intensity profile. An egress pixel position associated with an egress zero-crossing second derivative value is determined. The egress pixel position is determined as being located between a third pixel position with a second maximum intensity value of the intensity profile and a fourth pixel position with a second minimum intensity value of the intensity profile. When the ingress and egress pixel positions are determined, the midpoint pixel position between the ingress pixel position and the egress pixel position is output as the position of the sheet of light.

In accordance with one embodiment, a method for detecting a position of a sheet of light in an image is described. The method includes applying a second derivative filter to an intensity profile of a line of pixels included in an image of the sheet of light as projected onto an object to obtain a plurality of second derivative values associated with corresponding pixel positions. The method continues with determining an ingress pixel position associated with an ingress zero-crossing second derivative value, wherein the ingress pixel position is between a first pixel position with a first minimum intensity value of the intensity profile and a second pixel position with a first maximum intensity value of the intensity profile. The method continues with determining an egress pixel position associated with an egress zero-crossing second derivative value, wherein the egress pixel position is between a third pixel position with a second maximum intensity value of the intensity profile and a fourth pixel position with a second minimum intensity value of the intensity profile; determining a midpoint pixel position between the ingress pixel position and the egress pixel position; and outputting the midpoint pixel position as the position of the sheet of light.

According to one embodiment, a field-programmable gate array (FPGA) to detect a position of a sheet of light in an image is described. The FPGA includes a set of one or more processing units; and a non-transitory machine-readable storage medium containing code, which when executed by the set of one or more processing units, causes the FPGA to apply a second derivative filter to an intensity profile of a line of pixels included in an image of the sheet of light as projected onto an object to obtain a plurality of second derivative values associated with corresponding pixel positions, determine an ingress pixel position associated with an ingress zero-crossing second derivative value, wherein the ingress pixel position is between a first pixel position with a first minimum intensity value of the intensity profile and a second pixel position with a first maximum intensity value of the intensity profile, determine an egress pixel position associated with an egress zero-crossing second derivative value, wherein the egress pixel position is between a third pixel position with a second maximum intensity value of the intensity profile and a fourth pixel position with a second minimum intensity value of the intensity profile, determine a midpoint pixel position between the ingress pixel position and the egress pixel position, and output the midpoint pixel position as the position of the sheet of light.

According to one embodiment, a non-transitory computer readable storage medium that provide instructions is described. The instructions when executed by a processor of a proxy server, cause said processor to perform operations comprising applying a second derivative filter to an intensity profile of a line of pixels included in an image of a sheet of light as projected onto an object to obtain a plurality of second derivative values associated with corresponding pixel positions; determining an ingress pixel position associated with an ingress zero-crossing second derivative value, wherein the ingress pixel position is between a first pixel position with a first minimum intensity value of the intensity profile and a second pixel position with a first maximum intensity value of the intensity profile; determining an egress pixel position associated with an egress zero-crossing second derivative value, wherein the egress pixel position is between a third pixel position with a second maximum intensity value of the intensity profile and a fourth pixel position with a second minimum intensity value of the intensity profile; determining a midpoint pixel position between the ingress pixel position and the egress pixel position; and outputting the midpoint pixel position as a position of the sheet of light.

BRIEF DESCRIPTION OF THE DRAWINGS

The invention may best be understood by referring to the following description and accompanying drawings that are used to illustrate embodiments of the invention. In the drawings:

FIG. 2A illustrates an exemplary 2D image as acquired by an image acquisition device in accordance with some embodiments.

FIG. 2B illustrates an exemplary 2D image as acquired by an image acquisition device in accordance with some embodiments.

FIG. 4A illustrates an exemplary intensity profile of a scan line of pixels from an image as acquired by an acquisition device, where the image is of an object of interest illuminated with a sheet of light in accordance with some embodiments.

FIG. 4B illustrates a second derivative curve of an intensity profile in accordance with some embodiments.

DESCRIPTION OF EMBODIMENTS

Figure 1:
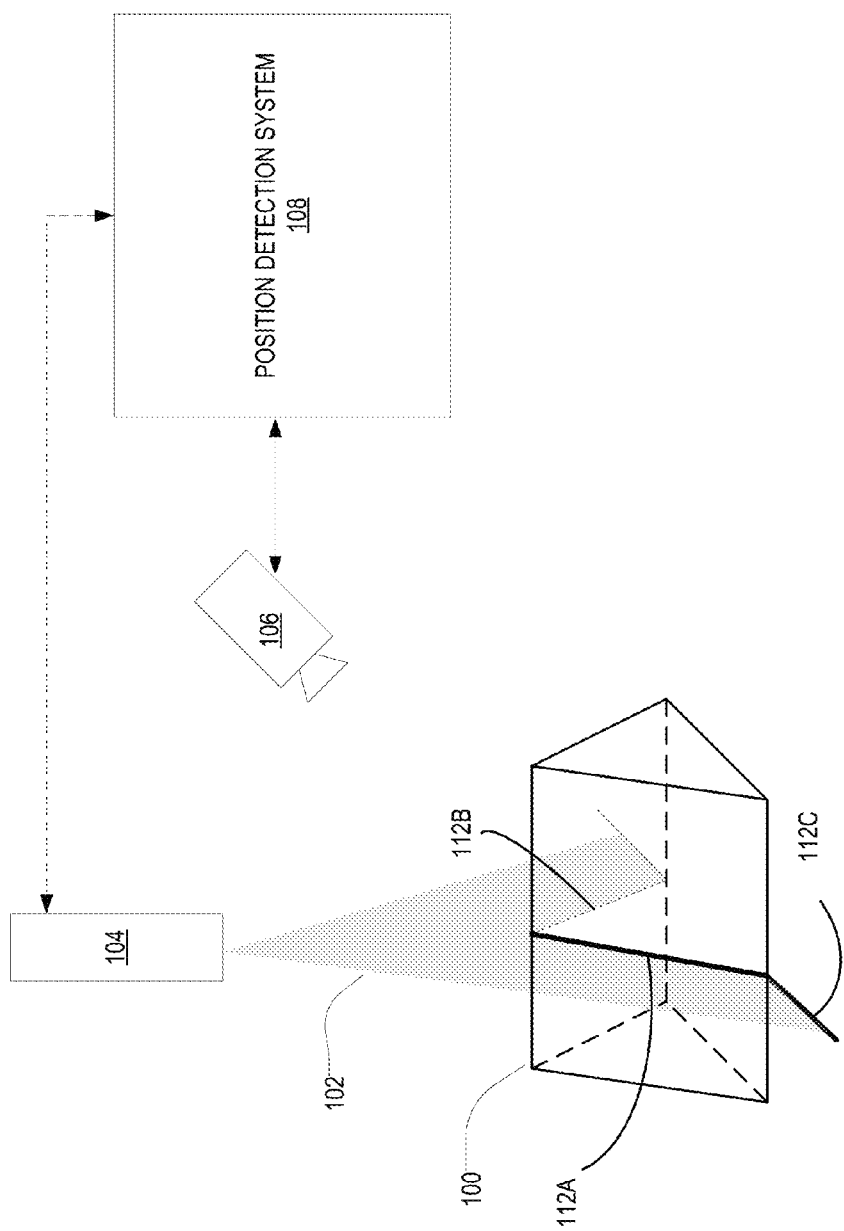
FIG. 1 illustrates a block diagram of an exemplary 3D measurement/reconstruction system in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Standard Approaches for Detection of the Position of a Sheet of Light in an Image:

3D measurement and reconstructions systems analyze images of one or more sheet of lights (e.g., laser beam or a structured light) as projected on the surface of an object of interest to extract 3D measurements or reconstruct the object of interest. The accuracy of the 3D measurement/reconstruction depends on the accuracy of the detected positions of the sheet of lights in the acquired images.

A standard approach used to detect the position of a sheet of light in an image is to determine the center of gravity of the sheet of light in an intensity profile of the image (or of a portion of an image such as a column or a row). According to this approach, a window of fixed size is moved across the intensity profile and for each window position, a sum or average of the pixel intensities in the window is computed. Window positions having a sum (average) of pixel intensities below a predefined threshold are discarded. Among the remaining window positions, the window position having the highest sum (average) of pixel intensities is selected and the center of gravity of the selected window position is returned as the detected laser position.

Another approach used to detect the position of a sheet of light in an image is based on a first derivative of an intensity profile of the image (or of a portion of an image such as a column or a row). In this approach, two parameters are used, namely the width of the widest peak to be detected and the intensity difference of the least-contrasted peak to be detected. From these two parameters, a size S, a distance D, and a threshold T are determined. A region of interest (ROI) is determined based on the intensity profile, distance D and threshold T. A derivative filter of size S is applied to the intensity profile to produce a slope of the intensity profile. In the determined ROI, one or more zero-crossings in the slope of the intensity profile are detected. From the detected zero-crossings, a zero-crossing is selected and the position of the selected zero-crossing is returned as the detected position of the sheet of light for the line of pixels.

These prior art approaches have several limitations and are therefore not suitable for certain applications. For example, the first approach is very sensitive to variations in the background intensity (DC offset) of the intensity profile. In addition, the effectiveness of the approach is highly dependent on the choice of the size of the window and the technique lacks robustness with regards to saturated peaks and large variations in peak widths. In some applications, the width of the sheet of light may vary significantly from a thin line with a Gaussian like profile of intensity to a large saturated flat line. Although the second approach may be used to detect the position of the sheet of light in the variety of scenarios (e.g., detecting the position of wide or thin sheet of lights), it cannot accomplish that with the same accuracy with a single set of parameters (e.g., a single set of size S, distance D, and threshold T).

The embodiments of the present invention overcome the limitations of the prior approaches and enable a robust and accurate extraction of the position of a sheet of light in varying scenarios with a single set of parameters. In addition, the mechanism described herein provide a computationally efficient technique that can be implemented on dedicated hardware (such as a Field-Programmable Gate Array (FPGA)), and which can detect the position of the sheet of light when image acquisition rates are very high (which is typical for this type of applications).

Detection of a Position of a Sheet of Light Based on Second Derivative

The embodiments of the present invention present methods and apparatus for detecting the position of a sheet of light in an image. The methods are based on a second derivative of an intensity profile of the image. A second derivative filter is applied to the intensity profile of a line of pixels included in the image of the sheet of light as projected onto an object to obtain a plurality of second derivative values associated with corresponding pixel positions. An ingress pixel position associated with an ingress zero-crossing second derivative value is determined. The ingress pixel position is determined as being located between a first pixel position with a first minimum intensity value of the intensity profile and a second pixel position with a first maximum intensity value of the intensity profile. The methods continues with the determination of an egress pixel position associated with an egress zero-crossing second derivative value. The egress pixel position is determined as being located between a third pixel position with a second maximum intensity value of the intensity profile and a fourth pixel position with a second minimum intensity value of the intensity profile. When the ingress and egress pixel positions are determined, the midpoint pixel position between the ingress pixel position and the egress pixel position is output as the position of the sheet of light.

FIG. 1 illustrates a block diagram of an exemplary 3D measurement/reconstruction system in accordance with some embodiments. An object 100 of interest is illuminated with a "sheet of light" 102 (e.g., a laser beam, or a structured light) generated using a light source 104 such as a laser, Digital Light Processing (DLP) projector or other adequate light source. One or more projections 112a, 112b, 112c of the sheet of light 102 on the object 100 provide information on the contour of the object 100. The projections 112a, 112b, 112c will vary in position, shape and number, as well as in width and brightness, as a function of the position, shape and properties of the object 100 and the light source 104. To measure the position of these projections 112a, 112b, 112c, an image of the object 100 illuminated by the light source 104 is acquired using an image acquisition device 106 (such as a digital camera) and the position of the sheet of light 102 in the acquired image is detected by a position detection system 108.

The operations in the following figures will be described with reference to the exemplary system of FIG. 1. However, it should be understood that the operations in these figures can be performed by embodiments of the invention other than those discussed with reference to FIG. 1, and the embodiments of the invention discussed with reference to FIG. 1 can perform operations different than those discussed with reference to the following figures.

FIG. 2A illustrates an exemplary 2D image 200A as acquired by an image acquisition device in accordance with some embodiments. In an exemplary embodiment, image 200A is an image of the object 100 with a sheet of light projected thereon as acquired by the image acquisition device 106 under given illumination conditions. In other embodiments, the image may be a one-dimensional (1D) image consisting of a single line of pixels, as obtained using a line scan camera for example. The projections 112a and 112b, of the sheet of light 102 appear in the image 200A as brighter portions 210a and 210b. In the image 200A, a scan line 204a of pixels at position $ka_i$ is shown to have a corresponding intensity profile 206a. Note that while a vertical scan line 204a is illustrated, horizontal scan lines may also be used. The intensity profile 206a represents the pixel intensity (e.g., grayscale intensity) along scan line 204a as a function of the pixel location y. The intensity profile 206a comprises a peak 208a which corresponds to the sheet of light in the scan line 204a. In some embodiments, the position of the peak 208a is indicative of the position $x_i$ of the sheet of light. The position detection system 108 of FIG. 1 is operative to determine the position $y_i$ of the sheet of light as identified by the position of the peak 208a.

FIG. 2B illustrates an exemplary 2D image 200B as acquired by an image acquisition device in accordance with some embodiments. In an exemplary embodiment, image 200B is an image of the object 100 with a sheet of light projected thereon as acquired by the image acquisition device 106 under illumination conditions different from the illumination conditions that resulted in the image 200A (e.g., different light source, different distance of the source from the object, etc.). Alternatively the different images may result from the illumination of different objects. While the image 200B is illustrated as a 2D image, in other embodiments, the image may be a one-dimensional (1D) image consisting of a single line of pixels, as obtained using a line scan camera for example. The projections 112a and 112b, of the sheet of light 102 appear in the image 200B as brighter portions 220a and 220b. In the image 200B, a scan line of pixels 204b at position $kb_i$ is shown to have a corresponding intensity profile 206b. Note that while a vertical scan line 204b is illustrated, horizontal scan lines may also be used. The intensity profile 206b represents the pixel intensity (e.g., grayscale intensity) along scan line 204b as a function of the pixel location y. The intensity profile 206b comprises a peak 208b forming a flat region, which corresponds to the sheet of light in the scan line 204b. In some embodiments, the position of the peak 208b is indicative of the position $xb_i$ of the sheet of light. However contrary to the exemplary image 200A, the peak 208b corresponds to a flat region lying between a first position $(xb_1)$ and a second position $(xb_2)$ along the y axis and is not associated with a single position $xb_i$ along the y axis. As will be described in further detail with reference to the following figures, the position detection system 108 of FIG. 1 is operative to accurately determine the position $x_i$ of the sheet of light within the flat region and/or associated with a single peak.

In some embodiments, each one of the images 200A-B comprise a plurality of scan lines of pixels, each one having an associated intensity profile. The position detection system 108 may thus be configured to detect the position of the sheet of light in each scan line of pixels. For example, in the 2D image 200A, the position detection system 108 may be configured to detect the position $x_i$ of the sheet of light in each column of pixels $k_i$ where i=1, 2, . . . N and return an array of detected positions $X=[x_1, x_2, \ldots x_N]$. In some cases, no sheet of light is detected in the intensity profile, in which case the detection method may return a value indicating that no sheet of light was detected for the line of pixels. In other cases, multiple positions for the sheet of light may be detected within a single intensity profile (e.g., due to the shape of the object or because multiple sheets of light are projected onto the object), in which case the detection method may return the multiple detected positions for the line of pixels.

Figure 3A:
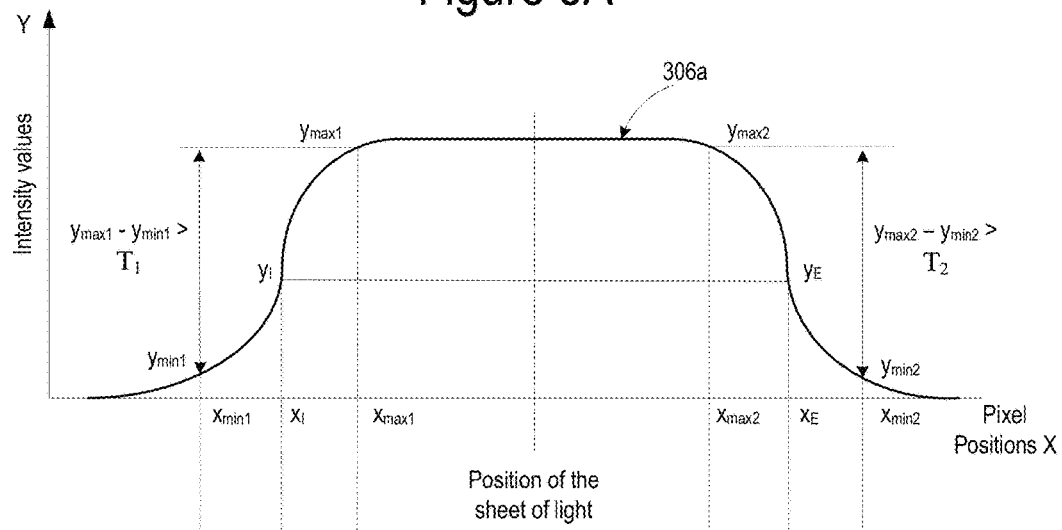
FIG. 3A illustrates an exemplary intensity profile of a scan line of pixels from an image as acquired by an acquisition device, where the image is of an object of interest illuminated with a sheet of light in accordance with some embodiments.
Figure 3B:
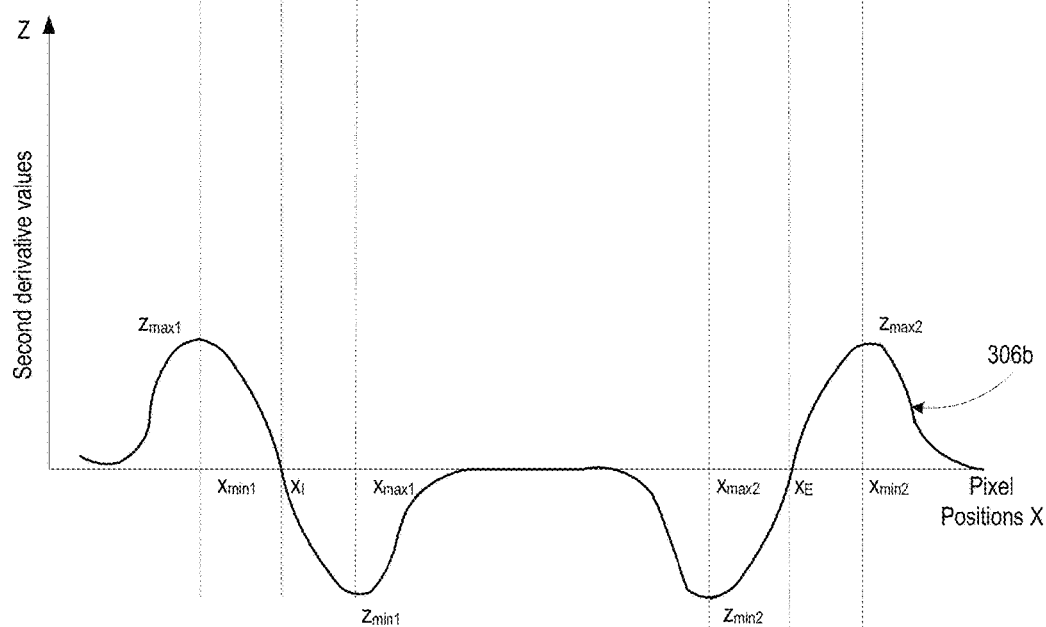
FIG. 3B illustrates a second derivative curve of an intensity profile in accordance with some embodiments.
Figure 9:
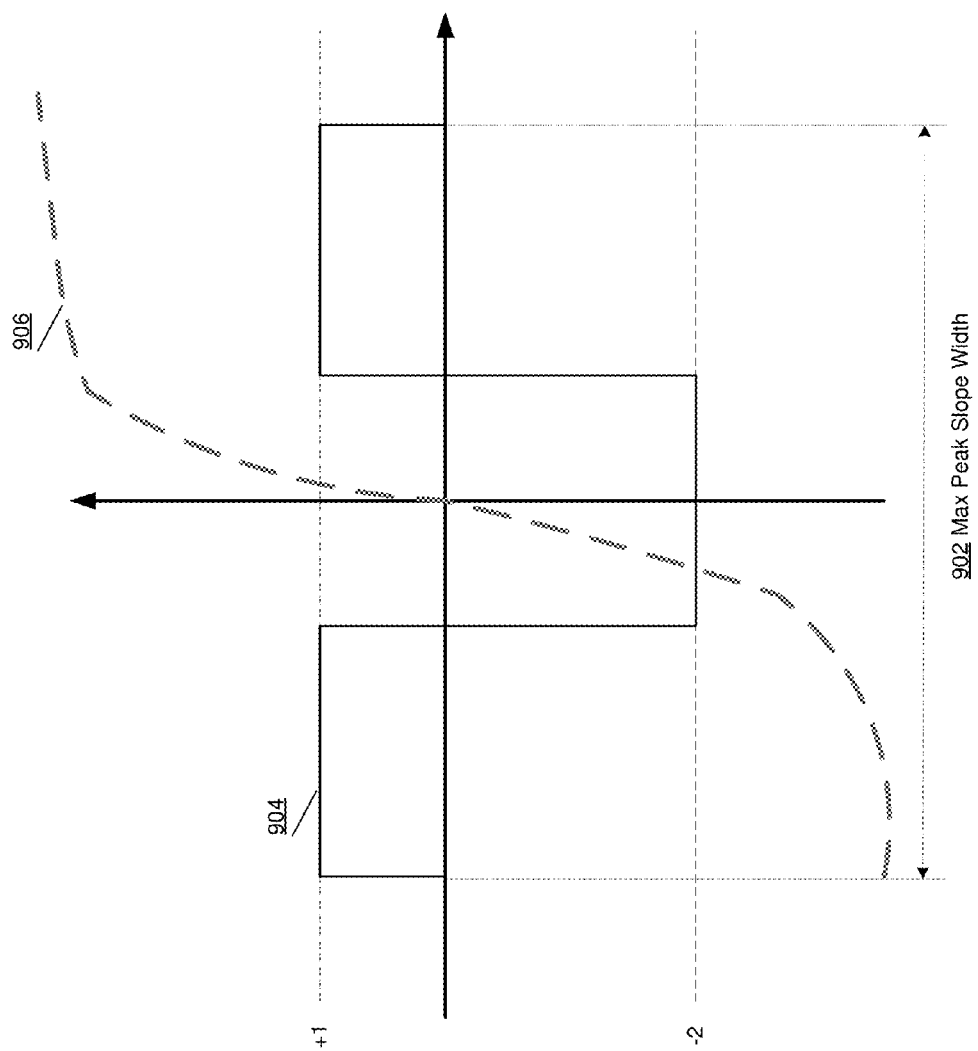
FIG. 9 illustrates an exemplary second derivative filter that may be used in some embodiments.

FIG. 3A illustrates an exemplary intensity profile 306a of a scan line of pixels from an image as acquired by an acquisition device, where the image is of an object of interest illuminated with a sheet of light in accordance with some embodiments. For example, the intensity profile 306a may be the intensity profile 206b of the scan line of pixels 204b at position $kb_i$ of FIG. 2B. The position detection system 108 is operative to detect the position of the sheet of light (e.g., 220a) in a line scan (e.g., 204b) based on the intensity profile 306a and a second derivative curve of the intensity profile. FIG. 3B illustrates a second derivative curve 306b of the intensity profile 306a in accordance with some embodiments. The second derivative curve 306b is the result of the application of a second derivative filter to an intensity profile of a line of pixels included in an image of the sheet of light as projected onto an object. In some embodiments, a second derivative filter 904 as illustrated in FIG. 9 is used to generate the second derivative curve (e.g., in which the filter 904 is adapted to fit the maximum peak slope width 902 of the exemplary intensity profile 906). In other embodiments, different filters may be used to generate the second derivate curve (e.g., the second derivative Gaussian filter). The second derivative curve includes a plurality of second derivative values $z_i$ associated with corresponding pixel positions $x_i$. While in some embodiments, the second derivative curve 306b is a set of continuous second derivative values, in other embodiments the second derivative curve is representative of a set of discrete second derivative values associated with a discrete set of pixel positions, where the set of pixel positions corresponds to the number of pixels of the line scan.

Based on the second derivative values, the position detection system 108 determines an ingress pixel position $x_I$ associated with an ingress zero-crossing second derivative value. Thus the position detection system 108 determines the pixel position $x_I$ by scanning the second derivative values and locating an ingress zero-crossing second derivative value. In one embodiment, the scan line of pixels (e.g., scan line 204b) is traversed from a first pixel position $x_1$ to a last pixel position $x_n$. In some embodiments a first pixel position $x_1$ and the last pixel position $x_n$ delimit the entire line of pixels (e.g., the line 204b), while in other embodiments these two positions delimit a portion of the scan line 204b illustrated in FIG. 2B (e.g., a first pass of processing may be performed on the scan line to locate one or more regions of interests that likely include a sheet of light, the two pixel positions indicate in this case the limits of one of these regions). For each current pixel position $x_i$ within the interval $[x_1, x_n]$, the position detection system 108 estimates the second derivative value of the intensity at that position and determines whether it has reached a zero-crossing of the second derivative. In some embodiments, the pixel position $x_i=x_I$ is identified as corresponding to a second derivative of value 0 preceded with a pixel position $x_{i-1}$ corresponding to a second derivative value that is positive. In other embodiments, the pixel position $x_I$ is identified as a pixel position located between a first pixel position associated with a strictly positive second derivative value (which is referred herein as a first positive pixel position) and a second pixel position association with a strictly negative second derivative value (which is referred herein as a first negative pixel position). For example, the pixel position $x_I$ is an interpolation of the first positive pixel position and the first negative pixel position (e.g., using a sub-pixel interpolation technique such as a linear interpolation).

In some embodiments, the ingress pixel position $x_I$ is located between a first pixel position $x_{min1}$ associated with a first minimum intensity value $y_{min1}$ of the intensity profile 306a and a second pixel position $x_{max1}$ with a first maximum intensity value $y_{max1}$ of the intensity profile, where the difference between the first maximum intensity value $y_{max1}$ and the first minimum intensity value $y_{min1}$ is greater than a predetermined threshold intensity value ($T_1$). According to these embodiments, the ingress pixel position $x_I$ is validated as corresponding to the ingress zero-crossing second derivative value if it is located between the first pixel position $x_{min1}$ and the second pixel position $x_{max1}$ and that the corresponding intensity values satisfy the threshold condition (i.e., that the difference between the first maximum intensity value $y_{max1}$ and the first minimum intensity value $y_{min1}$ is greater than a predetermined threshold intensity value ($T_1$)). Alternatively, if the intensity threshold condition is not satisfied and a pixel position associated to the zero-crossing of the derivative curve is not identified as the ingress pixel position $x_I$, in this case the position detection system 108 proceeds to analyzing the second derivative curve to locate another pixel position associated with a zero-crossing of the second derivative value. The predetermined threshold intensity value $T_1$ may be input to the position detection system 108 by a user and may be dependent on the type of applications. Alternatively, the predetermined threshold intensity value $T_1$ may be automatically determined by the position detection system 108 by a first pass analysis of the image and/or the scan line. The predetermined threshold intensity value $T_1$ indicates the minimum local contrast that needs to be satisfied by intensity values to identify the presence of a sheet of light in the image.

In one embodiment, the first minimum intensity value $y_{min1}$ is determined based upon a first maximum second derivative value $z_{max1}$ associated with the first pixel position $x_{min1}$. When the scan line is traversed, for each current pixel position $x_i$ within the interval $[x_1, x_n]$, the position detection system 108 estimates the second derivative value of the intensity at that position and determines whether it has reached the first maximum derivative value $z_{max1}$. In some embodiments the first maximum second derivative value $z_{max1}$ is a local maximum such that all second derivative values $z_i$ of preceding pixel positions and second derivative values of the following pixel positions, in the direction of the scan of the pixel positions, are smaller than the first maximum second derivative value $z_{max1}$. In other embodiments the first maximum second derivative value $z_{max1}$ is a local maximum such that all second derivative values $z_i$ of preceding pixel positions are smaller or equal than the first maximum second derivative value $z_{max1}$ and all second derivative values $z_i$ of succeeding pixel positions are strictly smaller than the first maximum second derivative value $z_{max1}$. When the position detection system 108 determines that the first maximum second derivative value $z_{max1}$ has been reached at position $x_{min1}$, the intensity value $y_{min1}$ associated with that same position is identified as the first minimum intensity value $y_{min1}$. In some embodiments, the first maximum second derivative value $z_{max1}$ is one of multiple local maximum second derivative values (not illustrated) associated with pixel positions preceding the ingress pixel position. In these embodiments the first maximum second derivative value $z_{max1}$ is selected as the maximum associated with the pixel position preceding ingress pixel position $x_I$, i.e., the maximum which is the closest to the zero crossing position of the second derivative (or in other words the pixel position with the minimum intensity value that is the closest to the point of inflection of the intensity curve, where the point of inflection has the coordinates $(x_I, y_I)$).

While in some embodiments the first minimum intensity value $y_{min1}$ is determined based on the first maximum second derivative value $z_{max1}$, in other embodiments, the first minimum intensity value $y_{min1}$ is identified only with respect to intensity values of the intensity profile without reference to the second derivative values. For example, when the intensity profile is scanned from the first pixel position $x_1$ to a current pixel position $x_i$, the position detection system 108 may keep track of the latest minimum in intensity values recorded (i.e., the latest minimum being smaller than all succeeding intensity values).

The first maximum intensity value $y_{max1}$ is determined based on a first minimum second derivative value $z_{min1}$ associated with the second pixel position $x_{max1}$. In some embodiments the first minimum second derivative value $z_{min1}$ is a local minimum such that all second derivative values $z_i$ of preceding pixel positions and second derivative values of the following pixel positions, in the direction of the scan of the pixel positions, are greater than the first minimum second derivative value $z_{min1}$. In other embodiments the first minimum second derivative value $z_{min1}$ is a local minimum such that all second derivative values $z_i$ of preceding pixel positions are strictly greater than the first minimum second derivative value $z_{min1}$ and all second derivative values $z_i$ of succeeding pixel positions are greater or equal to first minimum second derivative value $z_{min1}$. When the position detection system 108 determines that the first minimum second derivative value $z_{min1}$ has been reached at position $x_{min1}$, the intensity value $y_{max1}$ associated with that same position is identified as the first maximum intensity value $y_{max1}$. In some embodiments, the first minimum second derivative value $z_{min1}$ is one of multiple local minimum second derivative values (not illustrated) associated with pixel positions following the ingress pixel position. In these embodiments the first minimum second derivative value $z_{min1}$ is selected as the minimum associated with the pixel position immediately following the ingress pixel position $x_I$ in the direction of the scan of the pixel positions (i.e., the minimum which is the closest to the zero crossing position of the second derivative or in other words the pixel position with the maximum intensity value that is the closest to the point of inflection of the intensity curve, where the point of inflection has the coordinates $(x_I, y_I)$).

While in some embodiments the first maximum intensity value $y_{max1}$ is determined based on the first minimum second derivative value $z_{min1}$, in other embodiments, the first maximum intensity value $y_{max1}$ is identified only with respect to intensity values of the intensity profile without reference to the second derivative values. For example, when the intensity profile is scanned from the first pixel position $x_1$ to a current pixel position $x_i$, the position detection system 108 keeps track of the latest maximum in intensity values recorded (i.e., the latest maximum being greater or equal to all succeeding intensity values, for example the highest values prior to reaching the flat region of the intensity profile).

Once the ingress pixel position $x_I$ associated with the ingress zero-crossing of the second derivative is determined, the position detection system 108 determines an egress pixel position $x_E$ associated with an egress zero-crossing second derivative value. The scan line of pixels (e.g., scan line 204b) is continued to be traversed from the ingress pixel position $x_I$ to a current position $x_i$. For each current pixel position $x_i$ within the interval $[x_I, x_n]$, the position detection system 108 estimates the second derivative value of the intensity at that position and determines whether it has reached a second zero-crossing of the second derivative. In some embodiments, the pixel position $x_i = x_E$ is identified as corresponding to a second derivative of value 0 preceded with a pixel position corresponding to a second derivative value that is negative. In other embodiments, the pixel position $x_E$ is identified as a pixel position located between a first pixel position associated with a strictly negative second derivative value (which is referred herein as a second negative pixel position) and a second pixel position association with a strictly positive second derivative value (which is referred herein as a second positive pixel position). For example, the pixel position $x_E$ is an interpolation of the second negative pixel position and the first positive pixel position (e.g., using a sub-pixel interpolation technique such as linear interpolation).

In an embodiment, the egress pixel position is between a third pixel position $x_{max2}$ with a second maximum intensity value $y_{max2}$ of the intensity profile 306a and a fourth pixel position $x_{min2}$ with a second minimum intensity value $y_{min2}$ of the intensity profile, where the difference between the second maximum intensity value $y_{max2}$ and the second minimum intensity value $y_{min2}$ is greater than a predetermined threshold intensity value ($T_2$). According to these embodiments, the egress pixel position $x_E$ is validated as corresponding to the egress zero-crossing second derivative value if a first ingress pixel position has been found and the egress pixel position $x_E$ is located between the third pixel position $x_{max2}$ and the fourth pixel position $x_{min2}$ and that the corresponding intensity values satisfy the threshold condition (i.e., the difference between the second maximum intensity value $y_{max2}$ and the second minimum intensity value $y_{min2}$ is greater than a predetermined threshold intensity value ($T_2$)). Alternatively, if the intensity threshold condition is not satisfied and a pixel position associated to the zero-crossing of the derivative curve is not identified as the egress pixel position $x_E$, in this case the position detection system 108 proceeds to analyzing the second derivative curve to locate another pixel position associated with a zero-crossing of the second derivative value. The predetermined threshold intensity value $T_2$ may be input to the position detection system 108 by a user and may be dependent on the type of applications. Alternatively, the predetermined threshold intensity value $T_2$ may be automatically determined by the position detection system 108 by a first pass analysis of the image and/or the scan line. While in some embodiments, the threshold intensity value $T_2$ can be different from the threshold intensity value $T_1$, in other embodiments, the two threshold values are identical. The predetermined threshold intensity value $T_2$ indicates the minimum local contrast that needs to be satisfied by intensity values to identify the presence of a sheet of light in the image.

In one embodiment, the second maximum intensity value $y_{max2}$ is determined based upon a second minimum second derivative value $z_{min2}$ associated with the third pixel position $x_{max2}$. When the scan line is traversed, for each current pixel position $x_i$ within the interval $[x_I, x_n]$, the position detection system 108 estimates the second derivative value of the intensity at that position and determines whether it has reached the second minimum derivative value $z_{min2}$. In some embodiments the second minimum second derivative value $z_{min2}$ is a local minimum such that all second derivative values $z_i$ of preceding pixel positions and second derivative values of the following pixel positions, in the direction of the scan of the pixel positions, are greater than the second minimum second derivative value $z_{min2}$. In other embodiments the second minimum second derivative value $z_{min2}$ is a local minimum such that all second derivative values $z_i$ of preceding pixel positions are greater than or equal to the second minimum second derivative value $z_{min2}$ and all second derivative values $z_i$ of succeeding pixel positions are strictly greater than the second minimum second derivative value $z_{min2}$. When the position detection system 108 determines that the second minimum second derivative value $z_{min2}$ has been reached at position $x_{max2}$, the intensity value $y_{max2}$ associated with that same position is identified as the second maximum intensity value $y_{max2}$. In some embodiments, the second minimum second derivative value $z_{min2}$ is one of multiple local minimum second derivative values (not illustrated) associated with pixel positions preceding the egress pixel position. In these embodiments the second minimum second derivative value $z_{min2}$ is selected as the minimum associated with the pixel position immediately preceding egress pixel position $x_E$, i.e., the minimum which is the closest to the zero crossing position of the second derivative (or in other words the pixel position with the maximum intensity value that is the closest to the point of inflection of the intensity curve, where the point of inflection has the coordinates $(x_E, y_E)$).

While in some embodiments the second maximum intensity value $y_{max2}$ determined based on the second minimum second derivative value $z_{min2}$, in other embodiments, the second maximum intensity value $y_{max2}$ is identified only with respect to intensity values of the intensity profile without reference to the second derivative values. For example, when the intensity profile is scanned from the first pixel position $x_I$ to a current pixel position $x_i$, the position detection system 108 may keep track of the latest maximum in intensity values recorded (i.e., the latest maximum being greater than all succeeding intensity values).

The second minimum intensity value $y_{min2}$ is determined based on a second maximum second derivative value $z_{max2}$ associated with the second pixel position $x_{min2}$. In some embodiments the second maximum second derivative value $z_{max2}$ is a local maximum such that all second derivative values $z_i$ of preceding pixel positions and second derivative values of the following pixel positions, in the direction of the scan of the pixel positions, are smaller than the second maximum second derivative value $z_{max2}$. In other embodiments the second maximum second derivative value $z_{max2}$ is a local maximum such that all second derivative values $z_i$ of preceding pixel positions are strictly smaller than the second maximum second derivative value $z_{max2}$ and all second derivative values $z_i$ of succeeding pixel positions are smaller than or equal to the second maximum second derivative value $z_{max2}$. When the position detection system 108 determines that the second maximum second derivative value $z_{max2}$ has been reached at position $x_{min2}$, the intensity value $y_{min2}$ associated with that same position is identified as the second minimum intensity value $y_{min2}$. In some embodiments, the second maximum second derivative value $z_{max2}$ is one of multiple local maximum second derivative values (not illustrated) associated with pixel positions following the egress pixel position. In these embodiments the second maximum second derivative value $z_{max2}$ is selected as the maximum associated with the pixel position immediately following the egress pixel position $x_E$ in the direction of the scan of the pixel positions (i.e., the maximum which is the closest to the zero crossing position of the second derivative or in other words the pixel position with the minimum intensity value that is the closest to the point of inflection of the intensity curve, where the point of inflection has the coordinates $(x_E, y_E)$).

While in some embodiments the second minimum intensity value $y_{min2}$ is determined based on the second maximum second derivative value $z_{max2}$, in other embodiments, the second minimum intensity value $y_{min2}$ is identified only with respect to intensity values of the intensity profile without reference to the second derivative values. For example, when the intensity profile is scanned from the first pixel position $x_E$ to a current pixel position $x_i$, the position detection system 108 keeps track of the latest minimum in intensity values recorded (i.e., the latest minimum being greater or equal to all succeeding intensity values, for example the highest values prior to reaching the flat region of the intensity profile).

Once the ingress pixel position and the egress pixel position are determined, the position of the sheet of light is identified as the midpoint pixel position between the two positions. The position detection system then outputs the midpoint pixel position as the position of the sheet of light. In some embodiments, the position of the sheet of light is a sub-pixel position.

The techniques of the present invention can be used to determine the position of a sheet of light in a scan line of an image, when the intensity profile of the sheet takes several different shapes. For example, FIG. 3A illustrated an exemplary case where the intensity profile of the sheet of light includes a large flat region indicating that the sheet of light has a large width when compared with other intensity profiles. The following examples will show that the same technique can be used to detect the position of the sheet of light when the sheet of light and its corresponding intensity profile has different shapes.

FIG. 4A illustrates an exemplary intensity profile 406a of a scan line of pixels from an image of an object of interest illuminated with a sheet of light in accordance with some embodiments. For example, the intensity profile 406a may be the intensity profile 206a of the scan line of pixels 204a at position $ka_i$ of FIG. 2A. The position detection system 108 is operative to detect the position of the sheet of light (e.g., 210a) in a line scan (e.g., 204a) based on the intensity profile 406a and a second derivative curve of the intensity profile. FIG. 4B illustrates a second derivative curve 406b of the intensity profile 406a in accordance with some embodiments. The second derivative curve 406b is the result of the application of a second derivative filter to an intensity profile of a line of pixels included in an image of the sheet of light as projected onto an object. In some embodiments, a second derivative filter as illustrated in FIG. 9 is used to generate the second derivative curve. In other embodiments, different filters may be used to generate the second derivate curve. The second derivative curve includes a plurality of second derivative values $z_i$ associated with corresponding pixel positions $x_i$. While in some embodiments, the second derivative curve 406b is a set of continuous second derivative values, in other embodiments the second derivative curve is representative of a set of discrete second derivative values associated with a discrete set of pixel positions, where the set of pixel positions corresponds to the number of pixels of the line scan.

Based on the second derivative values, the position detection system 108 determines an ingress pixel position $x_I$ associated with an ingress zero-crossing second derivative value. Thus the position detection system 108 determines the pixel position $x_I$ by scanning the second derivative values and locating an ingress zero-crossing second derivative value. In one embodiment, the scan line of pixels (e.g., scan line 204a) is traversed from a first pixel position $x_1$ to a last pixel position $x_n$. In some embodiments a first pixel position $x_1$ and the last pixel position $x_n$ delimit the entire line of pixels (e.g., the line 204a), while in other embodiments these two positions delimit a portion of the scan line 204a illustrated in FIG. 2B (e.g., a first pass of processing may be performed on the scan line to locate one or more regions of interests that likely include a sheet of light, the two pixel positions indicate in this case the limits of one of these regions). For each current pixel position $x_i$ within the interval $[x_1, x_n]$, the position detection system 108 estimates the second derivative value of the intensity at that position and determines whether it has reached a zero-crossing of the second derivative. In some embodiments, the pixel position $x_i = x_I$ is identified as corresponding to a second derivative of value 0 preceded with a pixel position corresponding to a second derivative value that is positive. In other embodiments, the pixel position $x_I$ is identified as a pixel position located between a first pixel position associated with a strictly positive second derivative value (which is referred herein as a first positive pixel position) and a second pixel position association with a strictly negative second derivative value (which is referred herein as a first negative pixel position). For example, the pixel position $x_I$ is an interpolation of the first positive pixel position and the first negative pixel position (e.g., using a sub-pixel interpolation technique such as linear interpolation).

In some embodiments, the ingress pixel position $x_i$ is located between a first pixel position $x_{min1}$ associated with a first minimum intensity value $y_{min1}$ of the intensity profile 406a and a second pixel position $x_{max1}$ with a first maximum intensity value $y_{max1}$ of the intensity profile, where the difference between the first maximum intensity value $y_{max1}$ and the first minimum intensity value $y_{min1}$ is greater than a predetermined threshold intensity value (T1). According to these embodiments, the ingress pixel position $x_I$ is validated as corresponding to the ingress zero-crossing second derivative value if it is located between the first pixel position $x_{min1}$ and the second pixel position $x_{max1}$ and that the corresponding intensity values satisfy the threshold condition (i.e., that the difference between the first maximum intensity value ymax1 and the first minimum intensity value ymin1 is greater than a predetermined threshold intensity value ($T_1$)). Alternatively, if the intensity threshold condition is not satisfied, a pixel position associated to the zero-crossing of the derivative curve is not identified as the ingress pixel position $x_I$, in this case the position detection system 108 proceeds to analyzing the second derivative curve to locate another pixel position associated with a zero-crossing of the second derivative value. In one embodiment, the predetermined threshold intensity value $T_1$ may be input to the position detection system 108 by a user and may be dependent on the type of applications. In other embodiments, the predetermined threshold intensity value $T_1$ may be automatically determined by the position detection system 108 by a first pass analysis of the image and/or the scan line. The predetermined threshold intensity value $T_1$ indicates the minimum local contrast that needs to be satisfied by intensity values to identify the presence of a sheet of light in the image.

In one embodiment, the first minimum intensity value $y_{min1}$ is determined based upon a first maximum second derivative value $z_{max1}$ associated with the first pixel position $x_{min1}$. Similarly to the embodiments described with reference to FIG. 3A-B, when the scan line is traversed, for each current pixel position $x_i$ within the interval $[x_1, x_n]$, the position detection system 108 estimates the second derivative value of the intensity at that position and determines whether it has reached the first maximum derivative value $z_{max1}$. In some embodiments the first maximum second derivative value $z_{max1}$ is a local maximum such that all second derivative values $z_i$ of preceding pixel positions and second derivative values of the following pixel positions, in the direction of the scan of the pixel positions, are smaller than the first maximum second derivative value $z_{max1}$. In other embodiments the first maximum second derivative value $z_{max1}$ is a local maximum such that all second derivative values $z_i$ of preceding pixel positions are smaller or equal than the first maximum second derivative value $z_{max1}$ and all second derivative values $z_i$ of succeeding pixel positions are strictly smaller than the first maximum second derivative value $z_{max1}$. When the position detection system 108 determines that the first maximum second derivative value $z_{max1}$ has been reached at position $x_{min1}$, the intensity value $y_{min1}$ associated with that same position is identified as the first minimum intensity value $y_{min1}$.

While in some embodiments the first minimum intensity value $y_{min1}$ is determined based on the first maximum second derivative value $z_{max1}$, in other embodiments, the first minimum intensity value $y_{min1}$ is identified only with respect to intensity values of the intensity profile without reference to the second derivative values. For example, when the intensity profile is scanned from the first pixel position $x_1$ to a current pixel position $x_i$, the position detection system 108 may keep track of the latest minimum in intensity values recorded (i.e., the latest minimum being smaller than all succeeding intensity values).

The first maximum intensity value $y_{max1}$ is determined based on a first minimum second derivative value $z_{min1}$ associated with the second pixel position $x_{max1}$. In some embodiments the first minimum second derivative value $z_{min1}$ is a local minimum such that all second derivative values $z_i$ of preceding pixel positions and second derivative values of the following pixel positions, in the direction of the scan of the pixel positions, are greater than the first minimum second derivative value $z_{min1}$. In other embodiments the first minimum second derivative value $z_{min1}$ is a local minimum such that all second derivative values $z_i$ of preceding pixel positions are strictly greater than the first minimum second derivative value $z_{min1}$ and all second derivative values $z_i$ of succeeding pixel positions are greater than or equal to the first minimum second derivative value $z_{min1}$. When the position detection system 108 determines that the first minimum second derivative value $z_{min1}$ has been reached at position $x_{min1}$, the intensity value $y_{max1}$ associated with that same position is identified as the first maximum intensity value $y_{max1}$.

While in some embodiments the first maximum intensity value $y_{max1}$ is determined based on the first minimum second derivative value $z_{min1}$, in other embodiments, the first maximum intensity value $y_{max1}$ is identified only with respect to intensity values of the intensity profile without reference to the second derivative values. For example, when the intensity profile is scanned from the first pixel position x1 to a current pixel position $x_i$, the position detection system 108 keeps track of the latest maximum in intensity values recorded (i.e., the latest maximum being greater or equal to all succeeding intensity values, for example the highest values prior to reaching the flat region of the intensity profile).

Once the ingress pixel position $x_I$ associated with the ingress zero-crossing of the second derivative is determined, the position detection system 108 determines an egress pixel position $x_E$ associated with an egress zero-crossing second derivative value. The scan line of pixels (e.g., scan line 204a) is continued to be traversed from the ingress pixel position $x_I$ to a current position $x_i$. For each current pixel position $x_i$ within the interval $[x_I, x_n]$, the position detection system 108 estimates the second derivative value of the intensity at that position and determines whether it has reached a second zero-crossing of the second derivative. In some embodiments, the pixel position $x_i = x_E$ is identified as corresponding to a second derivative of value 0 preceded with a pixel position $x_{i-1}$ corresponding to a second derivative value that is negative. In other embodiments, the pixel position $x_E$ is identified as a pixel position located between a first pixel position associated with a strictly negative second derivative value (which is referred herein as a second negative pixel position) and a second pixel position association with a strictly positive second derivative value (which is referred herein as a second positive pixel position). For example, the pixel position $x_E$ is an interpolation of the second negative pixel position and the first positive pixel position (e.g., using a sub-pixel interpolation technique).

In an embodiment, the egress pixel position is between a third pixel position $x_{max2}$ with a second maximum intensity value $y_{max2}$ of the intensity profile 406a and a fourth pixel position $x_{min2}$ with a second minimum intensity value $y_{min2}$ of the intensity profile, where the difference between the second maximum intensity value $y_{max2}$ and the second minimum intensity value $y_{min2}$ is greater than a predetermined threshold intensity value ($T_2$). In the illustrated example of FIG. 4A, the second maximum intensity value $y_{max2}$ is identical to the first maximum intensity value $y_{max1}$. According to these embodiments, the egress pixel position $x_E$ is validated as corresponding to the egress zero-crossing second derivative value if an ingress pixel position has been found and the egress pixel position $x_E$ is located between the third pixel position $x_{max2}$ and the fourth pixel position $x_{min2}$ and that the corresponding intensity values satisfy the threshold condition (i.e., the difference between the second maximum intensity value $y_{max2}$ and the second minimum intensity value $y_{min2}$ is greater than a predetermined threshold intensity value $T_2$). If the intensity threshold condition is not satisfied, the pixel position associated to the zero-crossing of the derivative curve is not identified as the egress pixel position $x_E$, in this case the position detection system 108 proceeds to analyzing the second derivative curve to locate another pixel position associated with a zero-crossing of the second derivative value.

In one embodiment, the second maximum intensity value $y_{max2}$ is determined based upon a second minimum second derivative value $z_{min2}$ associated with the third pixel position $x_{max2}$. When the scan line is traversed, for each current pixel position xi within the interval $[x_I, x_n]$, the position detection system 108 estimates the second derivative value of the intensity at that position and determines whether it has reached the second minimum derivative value $z_{min1}$. In some embodiments the second minimum second derivative value $z_{min2}$ is a local minimum such that all second derivative values $z_i$ of preceding pixel positions and second derivative values of the following pixel positions, in the direction of the scan of the pixel positions, are greater than the second minimum second derivative value $z_{min2}$. In other embodiments the second minimum second derivative value $z_{min2}$ is a local minimum such that all second derivative values $z_i$ of preceding pixel positions are greater than or equal to the second minimum second derivative value $z_{min2}$ and all second derivative values $z_i$ of succeeding pixel positions are strictly greater than the second minimum second derivative value $z_{min2}$. When the position detection system 108 determines that the second minimum second derivative value $z_{min2}$ has been reached at position $x_{max2}$, the intensity value $y_{max2}$ associated with that same position is identified as the second maximum intensity value $y_{max2}$.

While in some embodiments the second maximum intensity value $y_{max2}$ is determined based on the second minimum second derivative value $z_{min2}$, in other embodiments, the second maximum intensity value $y_{max2}$ is identified only with respect to intensity values of the intensity profile without reference to the second derivative values. For example, when the intensity profile is scanned from the first pixel position $x_I$ to a current pixel position $x_i$, the position detection system 108 may keep track of the latest maximum in intensity values recorded (i.e., the latest maximum being greater than all succeeding intensity values).

The second minimum intensity value $y_{min2}$ is determined based on a second maximum second derivative value $z_{max2}$ associated with the second pixel position $x_{min2}$. In some embodiments the second maximum second derivative value $z_{max2}$ is a local maximum such that all second derivative values $z_i$ of preceding pixel positions and second derivative values of the following pixel positions, in the direction of the scan of the pixel positions, are smaller than the second maximum second derivative value $z_{max2}$. In other embodiments the second maximum second derivative value $z_{max2}$ is a local maximum such that all second derivative values $z_i$ of preceding pixel positions are strictly smaller than the second maximum second derivative value $z_{max2}$ and all second derivative values $z_i$ of succeeding pixel positions are smaller than or equal to the second maximum second derivative value $z_{max2}$. When the position detection system 108 determines that the second maximum second derivative value $z_{max2}$ has been reached at position $x_{min2}$, the intensity value $y_{min2}$ associated with that same position is identified as the second minimum intensity value $y_{min2}$. In some embodiments, the second maximum second derivative value $z_{max2}$ is one of multiple local maximum second derivative values (not illustrated) associated with pixel positions following the egress pixel position. In these embodiments the second maximum second derivative value $z_{max2}$ is selected as the maximum associated with the pixel position immediately following the egress pixel position $x_E$ in the direction of the scan of the pixel positions (i.e., the maximum which is the closest to the zero crossing position of the second derivative or in other words the pixel position with the minimum intensity value that is the closest to the point of inflection of the intensity curve, where the point of inflection has the coordinates ($x_E$, $y_E$)).

While in some embodiments the second minimum intensity value $y_{min2}$ is determined based on the second maximum second derivative value $z_{max2}$, in other embodiments, the second minimum intensity value $y_{min2}$ is identified only with respect to intensity values of the intensity profile without reference to the second derivative values. For example, when the intensity profile is scanned from the first pixel position $x_E$ to a current pixel position $x_i$, the position detection system 108 keeps track of the latest minimum in intensity values recorded (i.e., the latest minimum being greater or equal to all succeeding intensity values, for example the highest values prior to reaching the flat region of the intensity profile).

Once the ingress pixel position $x_I$ and the egress pixel position $x_E$ are determined, the position of the sheet of light 412 is identified as the midpoint pixel position between the two positions. The position detection system then outputs the position of the sheet of light. As illustrated in FIG. 4A, in some embodiments, the pixel position of the sheet of light is not superposed to the position associated with the maximum intensity value of the intensity profile. In other embodiments, for example, when the intensity profile is symmetrical the position of the sheet of light 412 may be aligned with the pixel positions $x_{max1}$ (which is here equal to $x_{max2}$).

Figure 5A:
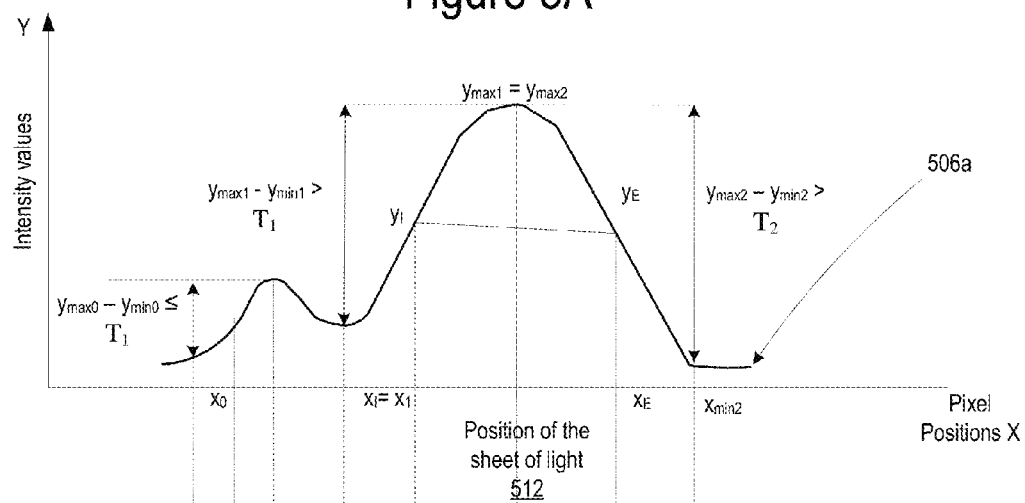
FIG. 5A illustrates an exemplary intensity profile of a scan line of pixels from an image as acquired by an acquisition device, where the image is of an object of interest illuminated with a sheet of light in accordance with some embodiments.
Figure 5B:
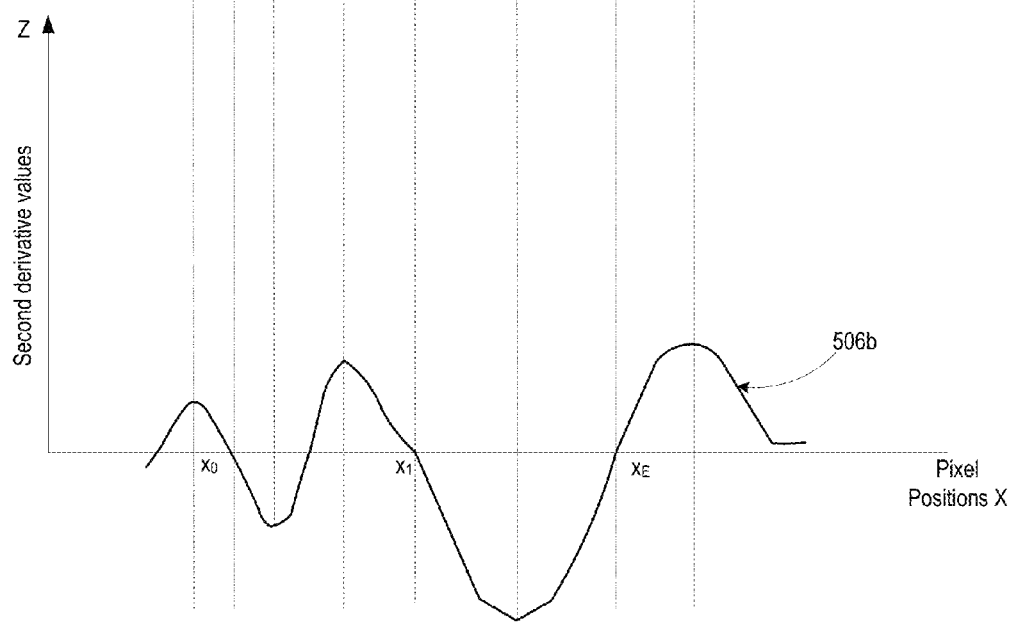
FIG. 5B illustrates a second derivative curve of an intensity profile in accordance with some embodiments.

FIG. 5A illustrates an exemplary intensity profile of a scan line of pixels from an image of an object of interest illuminated with a sheet of light in accordance with some embodiments. Similarly to the preceding exemplary embodiments, the position detection system 108 locates a ingress pixel position associated with a first zero-crossing of the second derivative curve, and locates an egress pixel position associated with a second zero-crossing of the second derivative curve to determine the position of the sheet of light based on the second derivative curve 506b of FIG. 5B. However, in this example, the second derivative includes two pixel positions $x_0$ and $x_1$ associated with zero-crossing of the second derivative of the intensity profile that are potential ingress pixel positions. Thus for each position which is a potential candidate to being an ingress pixel position, the difference between the intensity values $y_{max}$ and $y_{min}$ is checked to verify if it exceeds the threshold value $T_1$. In the illustrated example, the first pixel position $x_0$ does not satisfy the threshold condition and consequently is not selected as an ingress pixel position. The position detection system 108 proceeds then to analyzing the following pixel positions, and upon detection of the second pixel position $x_1$ associated with a second zero-crossing of the second derivative curve and the determination that the difference between the associated maximum intensity value and minimum intensity value is greater than the threshold intensity value $T_1$, the pixel position $x_1$ is identified as the ingress pixel position $x_I$. Once the ingress position is identified, the position detection system proceeds to identifying the egress pixel position $x_E$. In some embodiments, the detection of the egress pixel position $x_E$ is performed as described above with reference to FIG. 3A-B, and FIGS. 4A-4B based on the detection of a zero-crossing of the second derivative value. In some embodiments, the egress pixel position is identified only once an ingress pixel position has been first located. Thus in these embodiments, the position detection system 108 does not locate the egress pixel position if an ingress pixel position is not already located. Once the two pixel positions are identified (the ingress and the egress position) the position of the sheet of light 512 is calculated as the midpoint between the ingress and the egress pixel position.

While the exemplary embodiment of FIG. 5A illustrates a first pixel position $x_0$, which does not satisfy the threshold condition (i.e., the corresponding difference between the maximum intensity value and the minimum intensity value $(y_{max0}-y_{min0})$ is not greater than the threshold intensity value $T_1$), and a second pixel position $x_1$, which satisfies the threshold condition (i.e., the corresponding difference between the maximum intensity value and the minimum intensity value $(y_{max1}-y_{min1})$ is greater than the threshold intensity value $T_1$), in other embodiments the first pixel position may satisfy the threshold condition while the second pixel position may not satisfy the threshold condition. In these embodiments the ingress pixel position is then identified as being the first pixel position and the position of the sheet of light is calculated based on this first pixel position and the egress pixel position $x_E$.

In another embodiment, the first pixel position $x_0$ and the second pixel position $x_0$ may both satisfy the threshold condition, in this case, the position detection system 108 may select one of the two pixel positions to be the ingress pixel position based on additional criteria. For example, the ingress pixel position may be selected as the pixel position associated with the highest local contrast between its associated maximum intensity value and minimum intensity value. In other embodiments, the ingress pixel position is selected as the pixel position which is the closest to the peak of the intensity profile (where the peak can include a flat region). While the exemplary embodiments provided herein illustrate two potential ingress pixel positions, more than two ingress positions may be detected and the techniques described above can be used to select one ingress pixel position from the set of ingress pixel positions detected.

Similarly to the examples provided for the ingress pixel position, the second derivative of the intensity profile may further include more than one zero-crossing pixel positions (once the ingress position is identified) that are potential candidates for the egress pixel positions. In this case, similar methods for selecting the egress pixel position can be used.

The operations in the following flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 6:
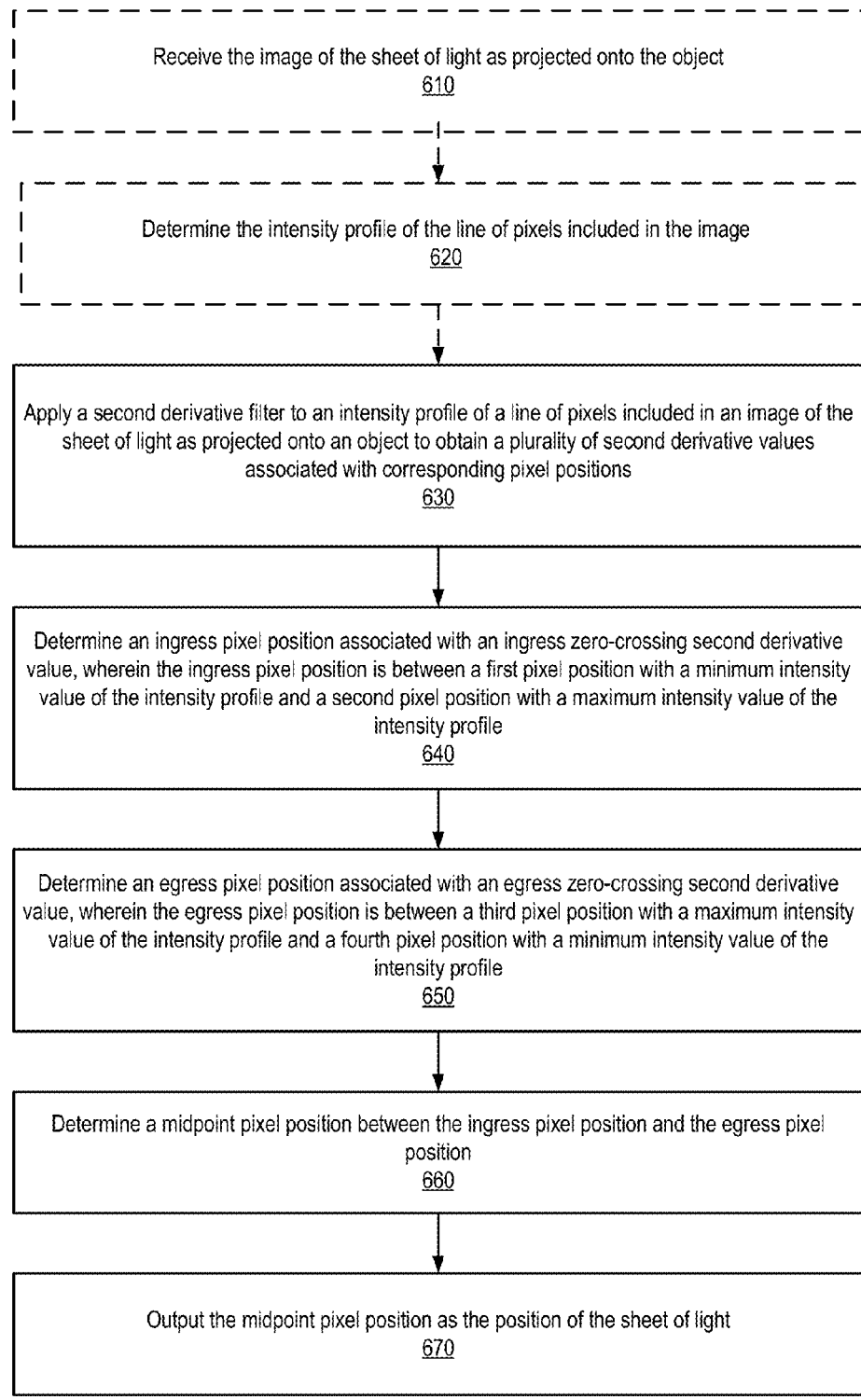
FIG. 6 illustrates a flow diagram of exemplary operations for detecting the position of a sheet of light in accordance with some embodiments.

FIG. 6 illustrates a flow diagram of exemplary operations for detecting the position of a sheet of light in accordance with some embodiments. At operation 610 an image of the sheet of light as projected onto an object of interest is received at the position detection system 108. The image of the sheet of light can be acquired by an image acquisition device in accordance with some embodiments. In an exemplary embodiment, the image is a 2 dimensional image, while in other embodiments, the image may be a one-dimensional (1D) image consisting of a single line of pixels, as obtained using a line scan camera for example. At operation 620, an intensity profile of one or more line of pixels included in the image is determined. For example, a scan line of pixels is extracted from a 2D image in order to be processed and to detect a position of the sheet of light within that scan line. Flow then moves to operation 630 where a second derivative filter is applied to the intensity profile of the line of pixels to obtain a plurality of second derivative values associated with corresponding pixel positions. At operation 640 the position detection system determines an ingress pixel position associated with an ingress zero-crossing second derivative value, wherein the ingress pixel position is between a first pixel position with a first minimum intensity value of the intensity profile and a second pixel position with a first maximum intensity value of the intensity profile. In some embodiments, the difference between the first maximum intensity value and the first minimum intensity value is greater that a predetermined threshold intensity value. Flow then moves to block 650 where an egress pixel position associated with an egress zero-crossing second derivative value is determined. The egress pixel position is between a third pixel position with a second maximum intensity value of the intensity profile and a fourth pixel position with a second minimum intensity value of the intensity profile, where the difference between the second maximum intensity value and the second minimum intensity value is greater that a predetermined threshold intensity value. In some embodiments the egress pixel position is determined only once the ingress pixel position has been located. The flow of operations then moves to block 660 at which the position detection system 108 determines a midpoint pixel position between the ingress pixel position and the egress pixel position; and outputs (at operation 670) the midpoint pixel position as the position of the sheet of light.

Figure 7:
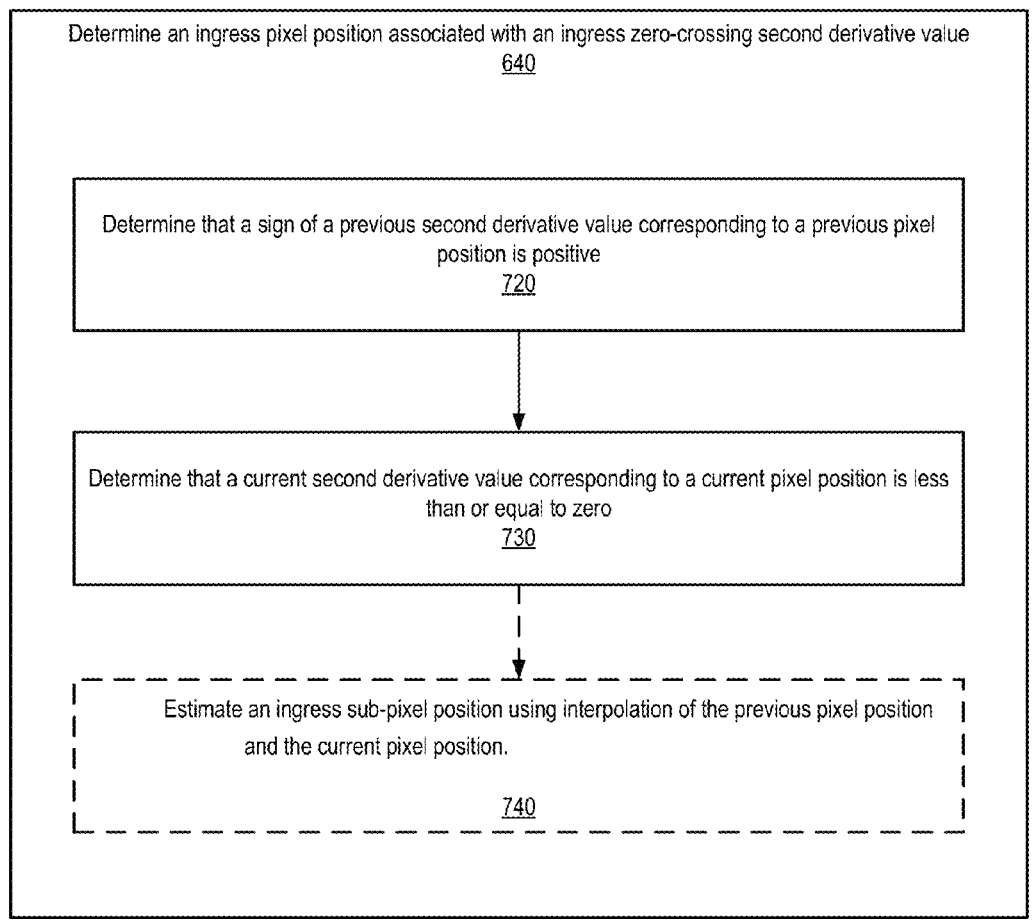
FIG. 7 illustrates a flow diagram of exemplary operations for determining an ingress pixel position in accordance with some embodiments.

FIG. 7 illustrates a flow diagram of exemplary operations for determining an ingress pixel position in accordance with some embodiments. At operation 720 the position detection system 108 determines that a sign of a previous second derivative value corresponding to a previous pixel position is positive, and determine at operation 730 that a current second derivative value corresponding to a current pixel position is less than or equal to zero. In some embodiments the ingress pixel position is associated with the current second derivative value, when the current second derivative value is 0 preceded with a pixel position $x_{i-1}$ corresponding to a second derivative value that is positive. In other embodiments, an additional operation is performed, operation 740, where an ingress sub-pixel position is estimated using interpolation of the previous pixel position and the current pixel position when the current second derivative value is strictly less than zero.

Figure 8:
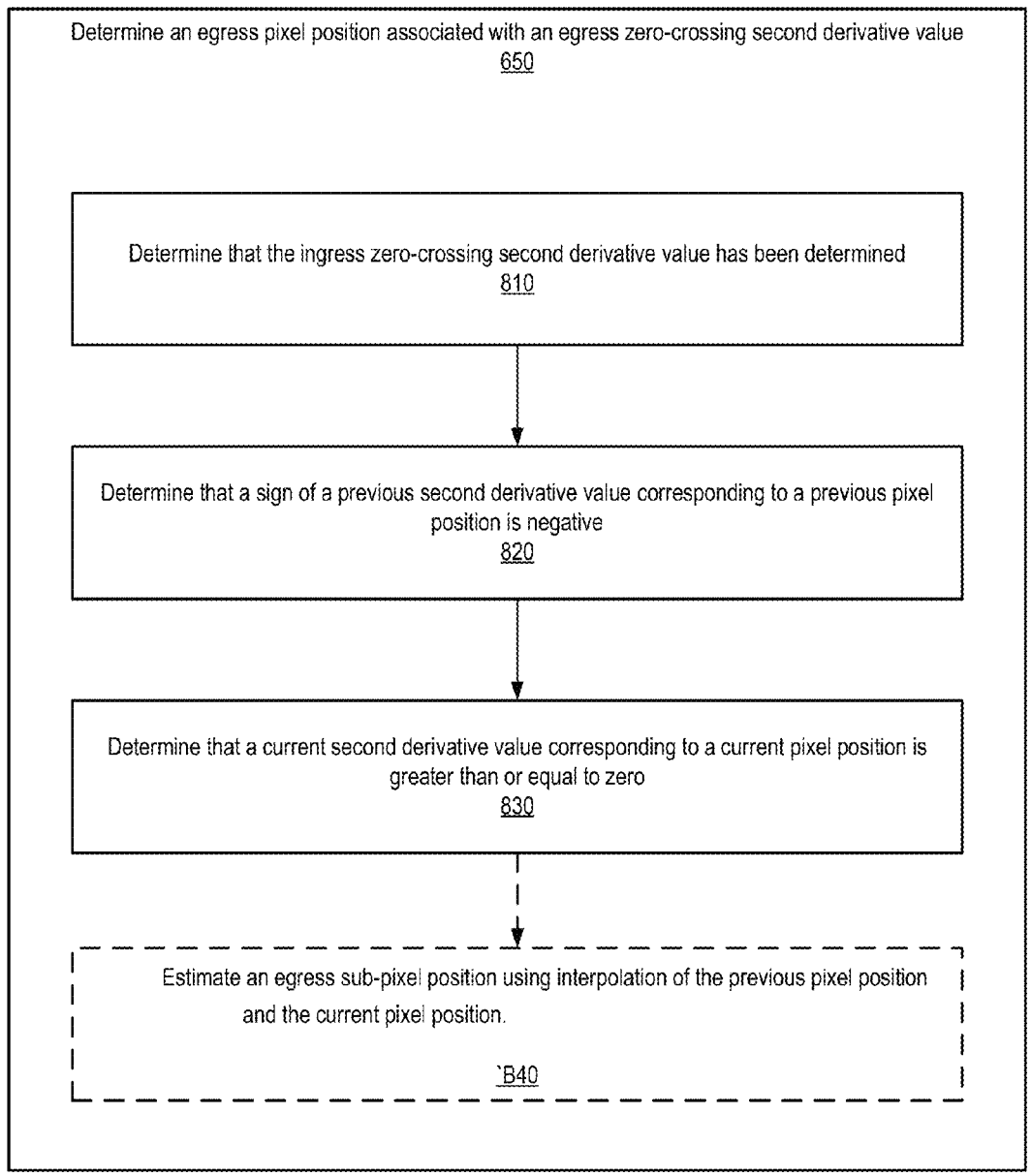
FIG. 8 illustrates a flow diagram of exemplary operations for determining an egress pixel position in accordance with some embodiments.

FIG. 8 illustrates a flow diagram of exemplary operations for determining an egress pixel position in accordance with some embodiments. At operations 810, the position detection system determines that the ingress zero-crossing second derivative value has been identified. At operation 820 the position detection system determines that a sign of a previous second derivative value corresponding to a previous pixel position is negative, and (at operation 830) that a current second derivative value corresponding to a current pixel position is greater than or equal to zero. In some embodiments the egress pixel position is associated with the current second derivative value, when the current second derivative value is 0 and the sign of the second derivative value associated with the previous pixel position is negative. In other embodiments, an additional operation is performed, at operation 740, the position detection system 108 estimates an egress sub-pixel position using interpolation of the previous pixel position and the current pixel position when the current second derivative value is strictly less than zero.

While embodiments described above discuss scanning an intensity profile or a second derivative curve from a first pixel position $x_1$ to a last pixel position $x_n$, and detecting the egress pixel position following the detection of the ingress pixel position, the present invention is not so limited. In alternative embodiments, the intensity profile and second derivative curve can be traversed in other directions and the detection of the ingress and egress pixel position can be performed in another order.

The embodiments of the present invention overcome the limitations of standard approaches for detecting the position of a sheet of light in an image and enable a robust and accurate extraction of the position of a sheet of light in varying scenarios with a single set of parameters. In addition, the mechanism described herein provide a computationally efficient technique that can be implemented on dedicated hardware (such as a Field-Programmable Gate Array (FPGA)), and which can detect the position of the sheet of light when image acquisition rates are very high (which is typical for this type of applications).

Figure 10:
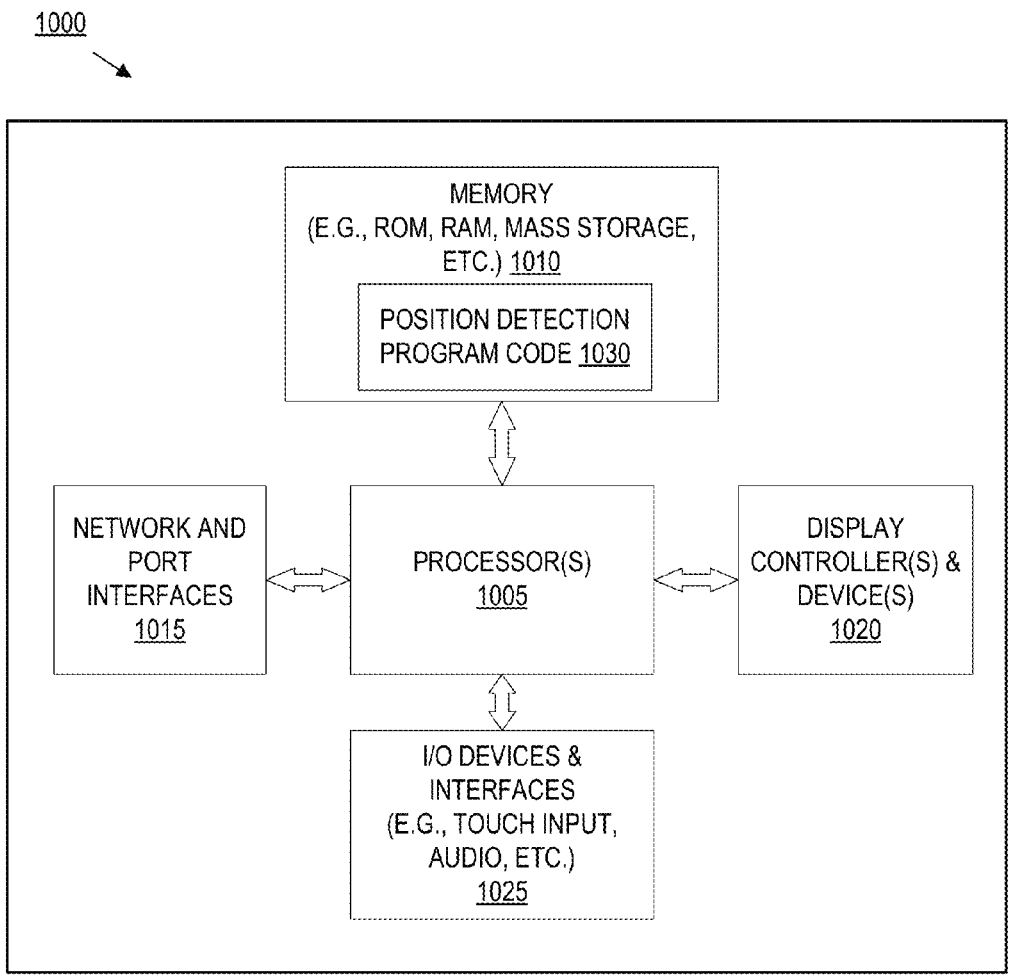
FIG. 10 is a block diagram illustrating an exemplary data processing system that may be used in some embodiments.

FIG. 10 illustrates a block diagram for an exemplary data processing system 1000 that may be used in some embodiments. Data processing system 1000 includes one or more processors 1005 and connected system components (e.g., multiple connected chips).

Alternatively, the data processing system 1000 is a system on a chip or Field-Programmable gate array. One or more such data processing systems 1000 may be utilized to implement the functionality of the position detection system 108 as illustrated in FIG. 1.

The data processing system 1000 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 1010 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 1005, and machine-readable transmission media (also called a carrier) (e.g., electrical, optical, radio, acoustical or other form of propagated signals—such as carrier waves, infrared signals). For example, the depicted machine readable storage media 1010 may store position detection program code 1030 that, when executed by the processor(s) 1005, causes the data processing system 1000 (e.g., position detection system 108) to locate the position of a sheet of light in an image. Thus, an electronic device (e.g., a computer or an FPGA) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The data processing system 1000 also includes an audio input/output subsystem 1015 which may include a microphone and/or a speaker for, for example, playing back music or other audio, receiving voice instructions to be executed by the processor(s) 1005, playing audio notifications, etc. A display controller and display device 1020 provides a visual user interface for the user, e.g., GUI elements or windows.

The data processing system 1000 also includes one or more input or output ("I/O") devices and interfaces 1025, which are provided to allow a user to provide input to, receive output from, and otherwise transfer data to and from the system. These I/O devices 1025 may include a mouse, keypad, keyboard, a touch panel or a multi-touch input panel, camera, frame grabber, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1000.

The I/O devices and interfaces 1025 may also include a connector for a dock or a connector for a USB interface, FireWire, Thunderbolt, Ethernet, etc., to connect the system 1000 with another device, external component, or a network.

Exemplary I/O devices and interfaces 1025 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 1000 with another device, external component, or a network and receive stored instructions, data, tokens, etc. It will be appreciated that one or more buses may be used to interconnect the various components shown in FIG. 10.

It will be appreciated that additional components, not shown, may also be part of the system 1000, and, in certain embodiments, fewer components than that shown in FIG. 10 may also be used in a data processing system 1000. For example, in some embodiments the data processing system 1000 may include or be coupled with an image acquisition device for acquiring images of the sheet of light as projected onto an object of interest.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for detecting a position of a sheet of light in an image, the method comprising:
    applying a second derivative filter to an intensity profile of a line of pixels included in an image of the sheet of light as projected onto an object to obtain a plurality of second derivative values associated with corresponding pixel positions;
    determining an ingress pixel position associated with an ingress zero-crossing second derivative value, wherein the ingress pixel position is between a first pixel position with a first minimum intensity value of the intensity profile and a second pixel position with a first maximum intensity value of the intensity profile;
    determining an egress pixel position associated with an egress zero-crossing second derivative value, wherein the egress pixel position is between a third pixel position with a second maximum intensity value of the intensity profile and a fourth pixel position with a second minimum intensity value of the intensity profile;
    determining a midpoint pixel position between the ingress pixel position and the egress pixel position; and
    outputting the midpoint pixel position as the position of the sheet of light.

2. The method of claim 1, wherein the method further comprises determining the first minimum intensity value and the first maximum intensity value respectively based on determining a first maximum second derivative value associated with the first pixel position and determining a first minimum second derivative value associated with the second pixel position.

3. The method of claim 1, wherein determining the ingress pixel position includes determining that a difference between the first maximum intensity value and the first minimum intensity value is greater than a threshold value.

4. The method of claim 1, wherein the method further comprises determining the second minimum intensity value and the second maximum intensity value respectively based on determining a first maximum second derivative value associated with the first pixel position and determining a first minimum second derivative value associated with the second pixel position.

5. The method of claim 1, wherein determining the egress pixel position includes determining that a difference between the second maximum intensity value and the second minimum intensity value is greater than a threshold value.

6. The method of claim 1, wherein the determining the ingress pixel position corresponding to the ingress zero-crossing second derivative value includes:
    determining that a sign of a previous second derivative value corresponding to a previous pixel position is positive; and
    determining that a current second derivative value corresponding to a current pixel position is less than or equal to zero.

7. The method of claim 6, wherein the determining the ingress pixel position further includes:
    estimating an ingress sub-pixel position using interpolation of the previous pixel position and the current pixel position.

8. The method of claim 1, wherein the determining the egress pixel position corresponding to the egress zero-crossing second derivative value includes:
    determining that the ingress zero-crossing second derivative value has been determined;
    determining that a sign of a previous second derivative value corresponding to a previous pixel position is negative; and
    determining that a current second derivative value corresponding to a current pixel position is greater than or equal to zero.

9. The method of claim 8, wherein the determining the egress pixel position further includes:
    estimating an egress sub-pixel position using interpolation of the previous pixel position and the current pixel position.

10. A field-programmable gate array (FPGA) to detect a position of a sheet of light in an image, the FPGA comprising:
    a set of one or more processing units; and
    a non-transitory machine-readable storage medium containing code, which when executed by the set of one or more processing units, causes the FPGA to:
        apply a second derivative filter to an intensity profile of a line of pixels included in an image of the sheet of light as projected onto an object to obtain a plurality of second derivative values associated with corresponding pixel positions,
        determine an ingress pixel position associated with an ingress zero-crossing second derivative value, wherein the ingress pixel position is between a first pixel position with a first minimum intensity value of the intensity profile and a second pixel position with a first maximum intensity value of the intensity profile,
        determine an egress pixel position associated with an egress zero-crossing second derivative value, wherein the egress pixel position is between a third pixel position with a second maximum intensity value of the intensity profile and a fourth pixel position with a second minimum intensity value of the intensity profile, determine a midpoint pixel position between the ingress pixel position and the egress pixel position, and output the midpoint pixel position as the position of the sheet of light.

11. The FPGA of claim 10, wherein the non-transitory machine-readable storage medium further contains code, which when executed by the set of one or more processing units, causes the FPGA to determine the first minimum intensity value and the first maximum intensity value respectively based on determining a first maximum second derivative value associated with the first pixel position and determining a first minimum second derivative value associated with the second pixel position.

12. The FPGA of claim 10, wherein to determine the ingress pixel position includes to determine that a difference between the first maximum intensity value and the first minimum intensity value is greater than a threshold value.

13. The FPGA of claim 10, wherein the non-transitory machine-readable storage medium further contains code, which when executed by the set of one or more processing units, causes the FPGA to determine the second minimum intensity value and the second maximum intensity value respectively based on determining a first maximum second derivative value associated with the first pixel position and determining a first minimum second derivative value associated with the second pixel position.

14. The FPGA of claim 10, wherein to determine the egress pixel position includes to determine that a difference between the second maximum intensity value and the second minimum intensity value is greater than a threshold value.

15. The FPGA of claim 10, wherein to determine the ingress pixel position corresponding to the ingress zero-crossing second derivative value includes:

to determine that a sign of a previous second derivative value corresponding to a previous pixel position is positive; and to determine that a current second derivative value corresponding to a current pixel position is less than or equal to zero.

16. The FPGA of claim 15, wherein to determine the ingress pixel position further includes:

to estimate an ingress sub-pixel position using interpolation of the previous pixel position and the current pixel position.

17. The FPGA claim 10, wherein to determine the egress pixel position corresponding to the egress zero-crossing second derivative value includes:

to determine that the ingress zero-crossing second derivative value has been determined;

to determine that a sign of a previous second derivative value corresponding to a previous pixel position is negative; and to determine that a current second derivative value corresponding to a current pixel position is greater than or equal to zero.

18. The FPGA of claim 17, wherein to determine the egress pixel position further includes:

to estimate an egress sub-pixel position using interpolation of the previous pixel position and the current pixel position.

19. A non-transitory computer readable storage medium that provide instructions, which when executed by a processor of a proxy server, cause said processor to perform operations comprising:

applying a second derivative filter to an intensity profile of a line of pixels included in an image of a sheet of light as projected onto an object to obtain a plurality of second derivative values associated with corresponding pixel positions;

determining an ingress pixel position associated with an ingress zero-crossing second derivative value, wherein the ingress pixel position is between a first pixel position with a first minimum intensity value of the intensity profile and a second pixel position with a first maximum intensity value of the intensity profile;

determining an egress pixel position associated with an egress zero-crossing second derivative value, wherein the egress pixel position is between a third pixel position with a second maximum intensity value of the intensity profile and a fourth pixel position with a second minimum intensity value of the intensity profile;

determining a midpoint pixel position between the ingress pixel position and the egress pixel position; and outputting the midpoint pixel position as a position of the sheet of light.

20. The non-transitory computer readable storage medium of claim 19, wherein the operations further comprise determining the first minimum intensity value and the first maximum intensity value respectively based on determining a first maximum second derivative value associated with the first pixel position and determining a first minimum second derivative value associated with the second pixel position.

21. The non-transitory computer readable storage medium of claim 19, wherein the determining the ingress pixel position includes determining that a difference between the first maximum intensity value and the first minimum intensity value is greater than a threshold value.

22. The non-transitory computer readable storage medium of claim 19, wherein the operations further comprise determining the second minimum intensity value and the second maximum intensity value respectively based on determining a first maximum second derivative value associated with the first pixel position and determining a first minimum second derivative value associated with the second pixel position.

23. The non-transitory computer readable storage medium of claim 19, wherein the determining the egress pixel position includes determining that a difference between the second maximum intensity value and the second minimum intensity value is greater than a threshold value.

24. The non-transitory computer readable storage medium of claim 19, wherein the determining the ingress pixel position corresponding to the ingress zero-crossing second derivative value includes:

determining that a sign of a previous second derivative value corresponding to a previous pixel position is positive; and determining that a current second derivative value corresponding to a current pixel position is less than or equal to zero.

25. The non-transitory computer readable storage medium of claim 24, wherein the determining the ingress pixel position further includes:

estimating an ingress sub-pixel position using interpolation of the previous pixel position and the current pixel position.

26. The non-transitory computer readable storage medium of claim 19, wherein the determining the egress pixel position corresponding to the egress zero-crossing second derivative value includes:
- determining that the ingress zero-crossing second derivative value has been determined;
- determining that a sign of a previous second derivative value corresponding to a previous pixel position is negative; and
- determining that a current second derivative value corresponding to a current pixel position is greater than or equal to zero.

27. The non-transitory computer readable storage medium of claim 26, wherein the determining the egress pixel position further includes:
- estimating an egress sub-pixel position using interpolation of the previous pixel position and the current pixel position.

\* \* \* \* \*